United States Patent
Lin et al.

(10) Patent No.: US 7,106,907 B2
(45) Date of Patent: Sep. 12, 2006

(54) ADAPTIVE ERROR-RESILIENT VIDEO ENCODING USING MULTIPLE DESCRIPTION MOTION COMPENSATION

(75) Inventors: Shunan Lin, Bronx, NY (US); Anthony Vetro, Short Hills, NJ (US); Yao Wang, Matawan, NJ (US)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 730 days.

(21) Appl. No.: 10/273,660

(22) Filed: Oct. 18, 2002

(65) Prior Publication Data
US 2004/0076332 A1    Apr. 22, 2004

(51) Int. Cl.
    *G06K 9/36*    (2006.01)
(52) U.S. Cl. .................. 382/236; 382/238; 382/244
(58) Field of Classification Search ................ 382/232, 382/236, 238, 250, 244, 245, 246, 247; 375/240.04, 375/240.12; 709/247; 348/470; 341/51, 341/65
See application file for complete search history.

(56) References Cited
U.S. PATENT DOCUMENTS

| | | | | |
|---|---|---|---|---|
| 4,749,983 A | * | 6/1988 | Langdon, Jr. ................ 341/51 |
| 5,680,129 A | * | 10/1997 | Weinberger et al. .......... 341/65 |
| 5,691,770 A | * | 11/1997 | Keesman et al. ...... 375/240.04 |
| 5,778,192 A | * | 7/1998 | Schuster et al. ............ 709/247 |
| 5,835,034 A | * | 11/1998 | Seroussi et al. .............. 341/65 |
| 5,960,116 A | * | 9/1999 | Kajiwara .................... 382/238 |
| 6,339,450 B1 | * | 1/2002 | Chang et al. ............... 348/470 |
| 6,556,624 B1 | * | 4/2003 | Orchard et al. ........ 375/240.12 |
| 6,785,425 B1 | * | 8/2004 | Feder et al. ................ 382/247 |

OTHER PUBLICATIONS

Budagavi et al., "Multiframe Video Coding for Improved Performance Over Wireless Channels", IEEE vol. 10, No. 2, Feb. 2001, pp. 252-265.*

* cited by examiner

*Primary Examiner*—Anh Hong Do
(74) *Attorney, Agent, or Firm*—Dirk Brinkman; Andrew J. Curtin

(57) ABSTRACT

A method estimates bit rates for sets of coding parameters, based on characteristics of a channel, and an end-to-end distortion is estimated based on signal statistics of the video. A particular set of coding parameters that satisfies an available bit rate of the channel and that minimizes the end-to-end distortion of the video is selected. Motion compensated multiple descriptions of the video are encoded according to the selected set of coding parameters.

21 Claims, 12 Drawing Sheets

| | Q0 = MinQ, Q1 = MinQ | Q0 = MinQ, Q1 = MinQ+1 | Q0 = MinQ, Q1 = MinQ +2 | ...... | Q0 = MaxQ, Q1 = MaxQ |
|---|---|---|---|---|---|
| a1 = 0.0 | (455kbps, 49.8dB) | (454kbps, 49.8dB) | (454kbps, 49.7dB) | ...... | (22kpbs, 25.0dB) |
| a1 = 0.1 | (452kbps, 50.1dB) | (451kbps, 50.0dB) | (451kbps, 50.0dB) | ...... | (21.5kpbs, 25.0dB) |
| a1 = 0.2 | (446kbps, 50.2dB) | (446kbps, 50.2dB) | (445kbps, 50.2dB) | ...... | (21.3kpbs, 24.9dB) |
| ...... | | | | | |
| a1 = 1.0 | (424kpbs, 51dB) | (422kpbs, 50.1dB) | (422kpbs, 50.0dB) | ...... | (20.2kpbs, 24.1dB) |

Figure 7

ADAPTIVE ERROR-RESILIENT VIDEO ENCODING USING MULTIPLE DESCRIPTION MOTION COMPENSATION

FIELD OF THE INVENTION

The present invention is related generally to the field of video encoding, and more particularly to error-resilient video encoding.

BACKGROUND OF THE INVENTION

Video encoding with compression enables storing, transmitting, and processing of audio-visual information with fewer storage, network, and processor resources. The most widely used video compression standards include MPEG-1 for storage and retrieval of moving pictures, MPEG-2 for digital television, and MPEG-4 and H.263 for low-bit rate video communications, see ISO/IEC 11172-2:1991. "Coding of moving pictures and associated audio for digital storage media at up to about 1.5 Mbps," ISO/IEC 13818-2:1994, "Information technology—generic coding of moving pictures and associated audio," ISO/IEC 14496-2:1999, "Information technology—coding of audio/visual objects," and ITU-T, "Video Coding for Low Bitrate Communication," Recommendation H.263, March 1996.

Most video compression schemes are designed to remove spatial redundancies within a single video frame and temporal redundancies between a sequence of video frames. A discrete cosine transform (DCT) is frequently used to compact signal energy and reduce the spatial redundancies, while motion compensation is used to minimize the temporal redundancies. Video frames are usually subdivided into macroblocks, e.g., 16×16 blocks, and the typical coding operations, such as motion compensation and DCT, are performed on a macroblock basis.

Frames can be encoded in two ways: (1) as intra-frames, e.g., I-frames, in which the entire frame is coded independently of any other frame, or (2) as inter-frames, e.g., P-frames, which employ motion compensation techniques and rely on the prediction of neighboring frames. Inter-coded frames may contain macroblocks that are intra-coded.

Compressed video is extremely sensitive to transmission errors due to the predictive nature in which the video signal is encoded. Errors introduced into the bitstream by channel impairments can result in very severe artifacts in the decoded video. Error recovery techniques for general data communication have been developed. For example, retransmission techniques aim for lossless delivery. However, such techniques cannot be applied to streaming video transmission due to delay constraints.

Error-resilient encoding techniques developed especially for videos are necessary for robust and reliable video transmission over error prone transport channels. The primary reason is that with video, even if all the bits of a frame are received correctly, it is still possible for the frame to be corrupt due to error propagation from a previously decoded frame. Motion compensation removes inter-frame temporal redundancy by encoding only a prediction error between a current frame and previously encoded frames, i.e., reference frames. Therefore, the loss of a reference frame can introduce errors that propagate into subsequent derived frames.

A fundamental problem in designing error-resilient video encoding schemes is that there exist contradictory requirements between compressing efficiency and error resilience. When the transport channel is lossy, there are two types of distortion observed at the decoder. The first is the encoding distortion, which is caused by quantization noise introduced during compression. The second is the distortion due to transmission errors. The total distortion includes the effects from both encoding distortion and transmission distortion and is referred to as end-to-end distortion.

Given an available bit rate (bandwidth), high compression efficiency requires one to minimize the encoding distortion by removing redundancy in the encoded bitstream. On the other hand, high error resilience requires reduction in transmission distortion by adding redundancy into the encoded bitstream.

Ideally, the video encoding scheme should balance the compression and error-resilience such that the end-to-end distortion is minimized. This must also be done under current channel characteristics, which account for the available bit rate on the channel and the channel error rate. It should be noted that most conventional video codecs do not consider methods for dynamically varying the amount of error resilience in the coded bitstream, but only focus on minimizing the coding distortion given the available bit rate.

In U.S. Pat. No. 6,317,462, "Method and apparatus for transmitting MPEG video over the internet," issued on Nov. 13, 2001 to Boyce et al., a coded bitstream is split into two partitions: a high-priority partition and a low-priority partition. A systematic forward error erasure/correction (FEC) code, such as a Reed Solomon (n, k) code, is then applied to bits in the high priority partition. Boyce focuses on protecting important information at the bit level. However, error propagation effects are not addressed.

One useful technique to mitigate error propagation effects is to force some macroblocks to be coded as intra-blocks, also referred to as intra-block refresh. By intentially turning off the motion compensation for some macroblocks, the intra-macro blocks do not depend on past frames and error propagation can be minimized for those blocks. In "Optimal intra coding of blocks for robust video communication over the internet," Image Communication, September 1999, Cote et al. described a random intra-block refresh technique to reduce the error propagation. The intra-block error rate $\beta$, influences both bit rate and the transmission distortion.

The above prior art techniques for error-resilient video can be classified into two main categories depending on the means of adding redundancy. The redundancy can be added explicitly, e.g., FEC, or implicitly, e.g., intra-block refresh. However, it should be noted that different error resilient tools differ in the methods for adding redundancy and utilizing redundancy to reduce distortions, i.e., it should be possible to provide a better error resilience tool to further reduce distortion with the same amount of redundancy.

Another important problem in designing an error resilient video encoding scheme is to determine the amount of redundancy to add. Ideally, this should change adaptively according to current video signal and current channel characteristics. If the channel has a smaller error rate, or if the frames contain less motion, then less redundancy is needed. Otherwise, more redundancy should be added. Usually, because the signal and channel characteristics vary over time, a good video encoding scheme for transmission should also be changing the coding methodology and the amount of the redundancy dynamically based on the signal and channel characteristics.

In U.S. Pat. No. 6,339,450, "Error resilient transcoding for video over wireless channels," issued on Jan. 15, 2002 to Chang et al., an error resilient transcoder is described. The transcoder maintains the resilience at an optimal level to accommodate the prevailing channel characteristics as measured by the BER of a wireless channel. The error resilience tools used include means for increasing the proportion of intra-blocks and increasing the length of slices.

In "Joint Source Channel Rate-Distortion Analysis for Adaptive Mode Selection and Rate Control in Wireless Video Coding" IEEE Trans. Circuits and System for Video Technology, June 2002, He et al. described a scheme to adaptively select intra-block rate and source-channel bit allocation based on time-varying wireless channel characteristics.

FIG. 1 shows the general structure of most prior art error-resilient encoders. Input video 101 is fed into a single description, error-resilient video encoder 110. The encoder 110 includes error resilience tools such as intra-block refresh. A statistics generator 120 extracts source statistics 121. A rate-distortion (R-D) statistics analyzer 130 adjusts the encoding behavior according to the source statistics 121 and channel characteristics 151. The R-D statistics 131 are used by a parameter and method selector 140 to determine coding parameters and coding methods 141, which in turn control the output 111 of the encoder 110.

To calculate the end-to-end distortion, which includes the distortion caused by transmission errors, the R-D statistics analyzer 130 requires the characteristics 151 of a transmission channel 150, such as packet loss rate 152. In addition, the channel throughput 153 also keeps changing. Therefore, the throughput is sent to the parameter and method selector 140 to help the process of parameter and method selection. Using the selected coding methods and parameters, the encoder 110 encodes the input signal 101 and outputs a coded bitstream 111 based on a single description.

Most prior art video coding techniques utilizing the above structure generate one bitstream for a video signal. Such coding schemes are referred to as single description error-resilient encoders and the bitstream produced by the encoder is referred to as single description. The advantage of single description coding is that the receiver can decode the video signal at a highest possible quality when the bitstream is received completely. However, if parts of the stream cannot be received, then received parts are of little use.

Multiple description coding (MDC) is different from traditional coding techniques. With MDC, a video signal is encoded into several bitstreams, i.e., descriptions. Now the receiver can recover the encoded signal by receiving any of these descriptions. In general, the more descriptions that are received, a higher quality decoded video is obtained. The motivation for using MDC is because the probability of losing all streams is much lower than losing one stream. Consequently, the receiver has a much higher chance to reconstruct the video with acceptable quality compared to using single description coding.

FIGS. 2A and 2B shows the basic structure of a prior art MD video encoder 210 and decoder 220 based on two descriptions. The MDC encoder 210 generates two bitstreams 211–212 from an input video 201 using a fixed set of parameters 202 and transmits the stream over two channels 213–214. The decoder 220 has three decoders 222–224, which are used dynamically according to the information received. If both descriptions, i.e., bitstreams, are received, then decoder II 223 is used to output a signal 226 with a lowest distortion. If only one bitstream, e.g., bitstream A 211, is received, decoder I 222 is used to output a signal 225 with a higher distortion. The same is true if only bitstream B 212 is received. In that case, decoder III 224 is used to output a signal 227 with a higher distortion.

FIG. 2C shows two example bitstreams 211 and 212 generated by a prior art MD video encoder. Bitstream 211 has the bits of coded even frames (2, 4, 6). Bitstreams 212 has the bits of coded odd frames (1, 3, 5). For each coded frame, there are two parts: a central part and a side part.

An MDC video coding scheme "Multiple Description Motion Compensation (MDMC)" was described by Wang et al. in "Error Resilient Video Coding Using Multiple Description Motion Compensation," IEEE Transaction on Circuits and Systems for Video Technology, June 2002.

FIG. 3A shows the encoder of that MDMC scheme 300. There are three primary components: a central encoder 310, an even side encoder 320 and an odd side encoder 330.

All frames of an input video 301 are fed into the central encoder 310. In the central encoder, a central prediction frame 351, c_pred, is constructed by a linear combination of two prediction frames 371–372, pred_frame1 and pred_frame2, as:

$$c\_pred = a1 * pred\_frame1 + (1-a1) * pred\_frame2, \quad (1)$$

where a1 is the weighting parameter used by a central predictor 350.

A difference 305 between the current frame and the prediction frame 351 is subject to a DCT 340, and then quantized by the central quantizer 345 with quantization parameter, Q0. The quantized DCT coefficients are variable length coded (VLC) 375 and sent as central part of bitstream A 376 when the current frame is an even frame, and as central part of bitstream B 377 when the current frame is an odd frame.

A frame reconstructor 355 inversely quantizes the quantized DCT coefficients, performs an inverse DCT, and then adds back the central prediction frame. The result is stored in a frame memory 360, which also stores two previously encoded frames.

A motion estimator 365 carries out motion estimation and determines two motion vectors, one between the current frame and previously coded even frame, and the other one between the current frame and previously coded odd frame. The two motion vectors and the two coded frames are sent into a prediction frame constructor 370, and two prediction frames, pred_frame1 373 and pred_frame2 374, are generated. Those two prediction frames are passed to the central predictor 350 and the central prediction frame 351 is constructed by a linear combination of the two prediction frames.

The even frames 302 of the input video sequence 301 are fed into the even side encoder 320. In the even side encoder, a side predictor 321 generates an even frame prediction frame 322 using pred_frame2 372. A difference 323 between the current frame and the prediction frame is DCT quantized 324. The DCT coefficients are subtracted 325 from the quantized DCT coefficients of the central branch, and then a side quantizer 326 quantizes the resulting signal with a quantization parameter, Q1. The quantized signal is variable length coding (VLC) 327 coded and sent as the side part of bitstream A 328.

Odd frames 303 of the input video sequence 301 are sent into the third branch, which is symmetric to the second branch and is illustrated simply as a side encoder for odd frames 330. The generated bitstream is sent as the side part of bitstream B 331.

In a video transmission system, the thus generated bitstreams are sent over different channels, which may either be two separate physical paths or a single path with two virtual channels. Assuming two bitstreams and two channels, there are three possible scenarios in the receiver. In the following, the decoding is described assuming frame level processing, however macroblock level processing can also be applied.

In the first scenario, as shown in FIG. 3B, the information for both the current frame, e.g., bitstream A, and the corresponding previous odd frame, bitstream B, are received. In that case, a conventional decoding strategy is applied. Bitstream A is first variable length decoded 378, then the bitstream is dequantized 380 and subject to an inverse DCT 382. The resulting signal is then added 383 to the prediction frame 389 generated by central predictor 388. The reconstructed frame 384 is finally displayed 385 and stored in the Frame Memory 386.

In the second scenario, as shown in FIG. 3C, the information of the current frame, e.g., bitstream A, is received and the corresponding previous odd frame, bitstream B, is lost. In this case, the side decoder is used. Both the central and side parts of bitstream A are passed through their respective VLD and dequantization processes. The two resulting components are then summed. This signal is then subject to an inverse DCT and added to the even prediction frame, which was constructed only from the previous even frame by the side predictor and prediction frame constructor. The resulting frame from the summation is the reconstructed even frame.

Because the previous odd frame is lost and current reconstructed even frame contains some information of the previous odd frame, a lost frame estimator or an odd frame estimator can be used to construct an odd frame to be used as a reference frame. After that, the estimated odd frame and the reconstructed even frame are displayed and stored in the frame memory 386.

In the third scenario, the information of the current frame is lost. Then, the decoder must wait for the next frame. If the next frame is received, then the side decoding strategy described for the second scenario is used. If the next frame is also lost, then a conventional error concealment method such as copying the previous frame can be used.

From the above scenarios, it is evident that if both streams are received, then the side part of the bitstream is totally useless. On the other hand, if some error happens, the side part of a bitstream can help to reconstruct a frame with lower, but still acceptable quality. So, the side part of a bitstream is considered redundant for the purpose of error resilience. It should be noted that the amount of the redundancy can be controlled by Q1, the quantization parameter used by the side quantizer.

The coding efficiency of both the central encoder and side encoder rely on the choice of Q0, the central quantization parameter, and a1, the weight used by the central predictor. Both of these parameters have a direct influence on the redundancy introduced since the mismatch signal depends on the output of the central quantizer, as well as the central prediction frame that is used to produce the input to the central quantizer.

Prior art adaptive error-resilient video coding focuses on single description codecs. However, the existing error-resilience models and techniques used by these codecs are not easily extended to multiple description coding. Also, the redundancy control methods are incompatible with each other. It is important for an error-resilient video coding scheme to be adaptive to changing signal and channel characteristics.

The performance of an MDMC codec, namely the coding efficiency and error resilience, is controlled by four parameters, a1, Q0, Q1, and β. In the prior art, the set of coding parameters used for coding are selected heuristically and implemented for fixed periods without regard for changing signal and channel characteristics. That is less than optimal. Therefore, there is a need for providing an adaptive MDMC coder that can select the coding methods and parameters dynamically based on the signal and channel characteristics.

SUMMARY OF THE INVENTION

The invention provides an adaptive multiple description motion compensation (MDMC) video codec for video transmission. The adaptive MDMC codec dynamically selects optimal coding parameters according to signal and channel characteristics so that end-to-end distortion of the transmitted video is minimized.

More particularly, first a bit rate is estimated for sets of coding parameters, based on characteristics of the channel, and an end-to-end distortion is estimated based on signal statistics of the video. A particular set of coding parameters that satisfies an available bit rate of the channel and that minimizes the end-to-end distortion of the video is selected. Motion compensated multiple descriptions of the video are then encoded 460 according to the selected set of coding parameters.

BRIEF DESCRIPTION OF THE DRAWINGS

FIG. 7 is a table defining rates and end-to-end distortions for possible coding parameters.

DETAILED DESCRIPTION OF PREFERRED EMBODIMENTS

System Structure

Figure 1:
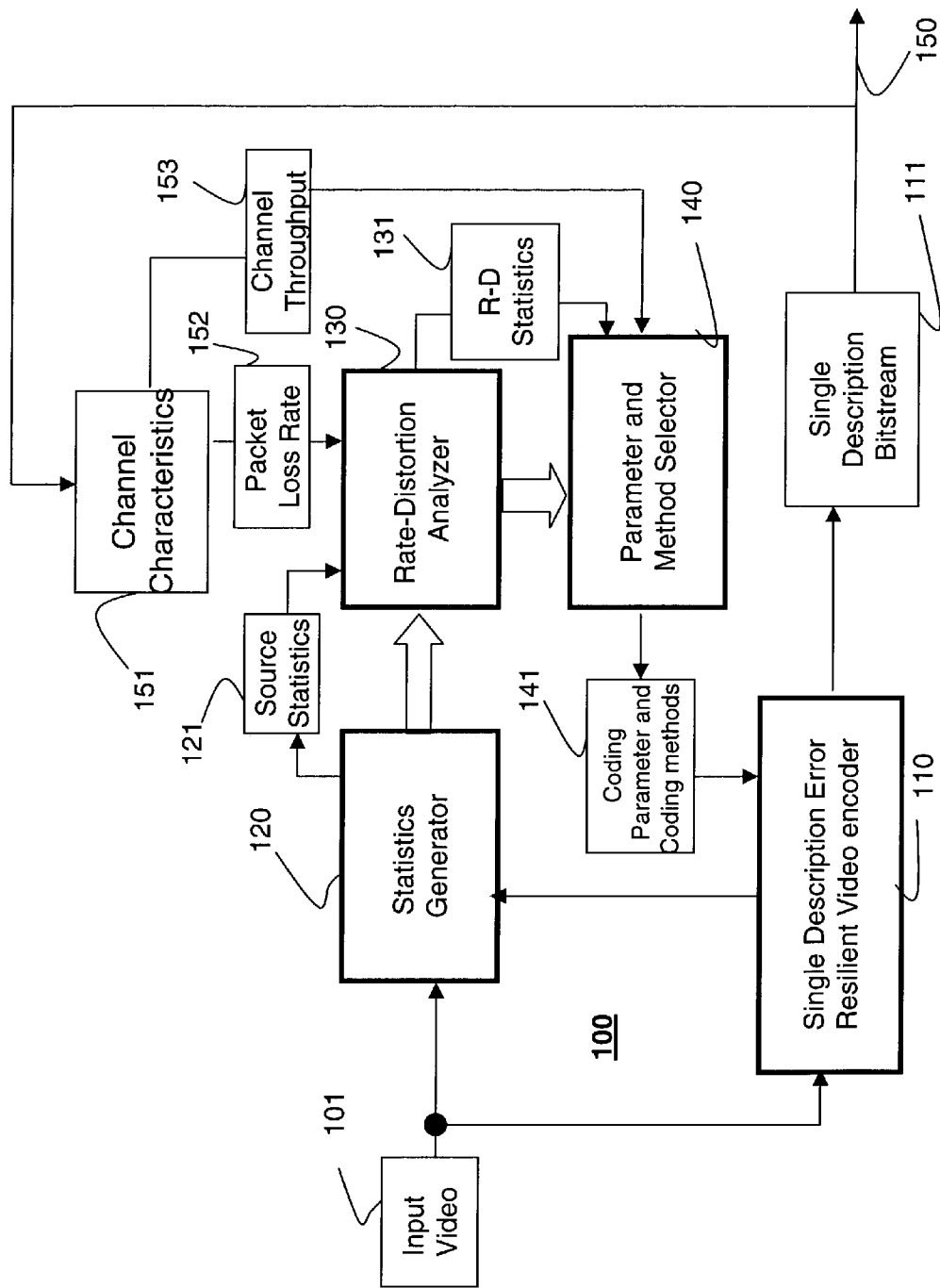
FIG. 1 is a block diagram of a prior art error-resilient single description video encoder.
Figure 2A:
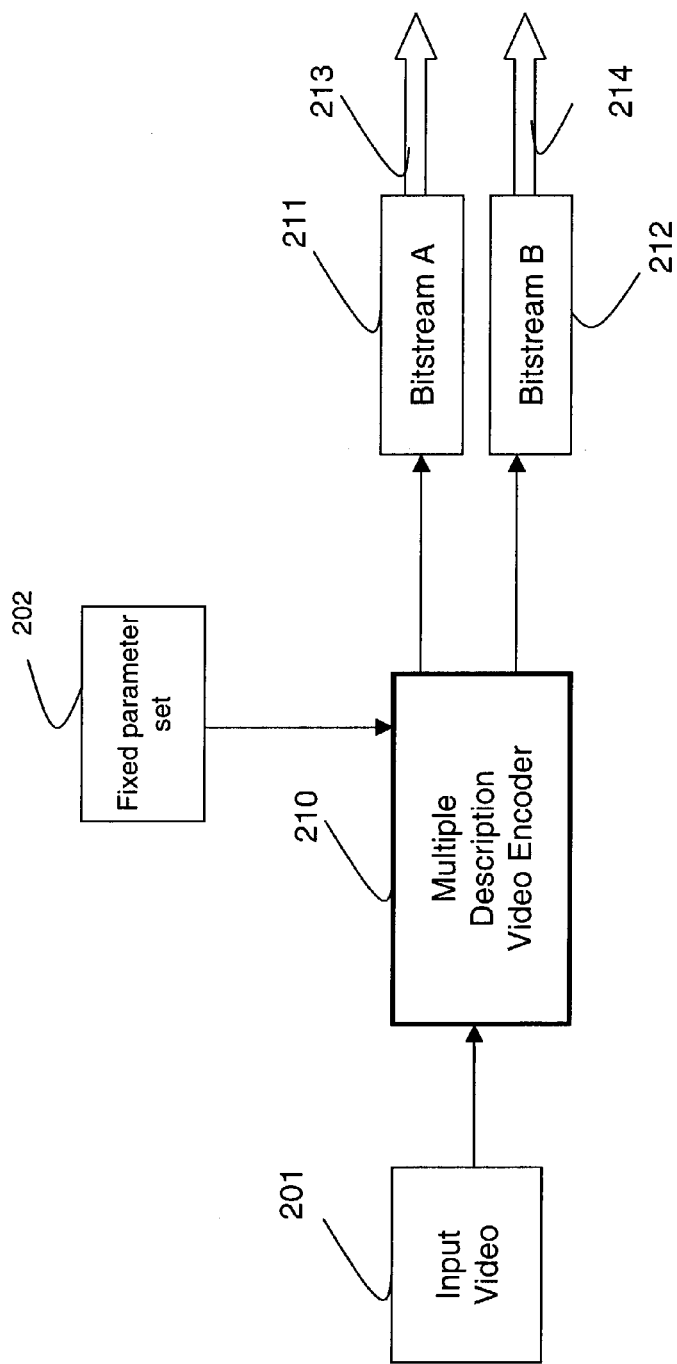
FIG. 2A is a block diagram of a prior art multiple description encoder.
Figure 2B:
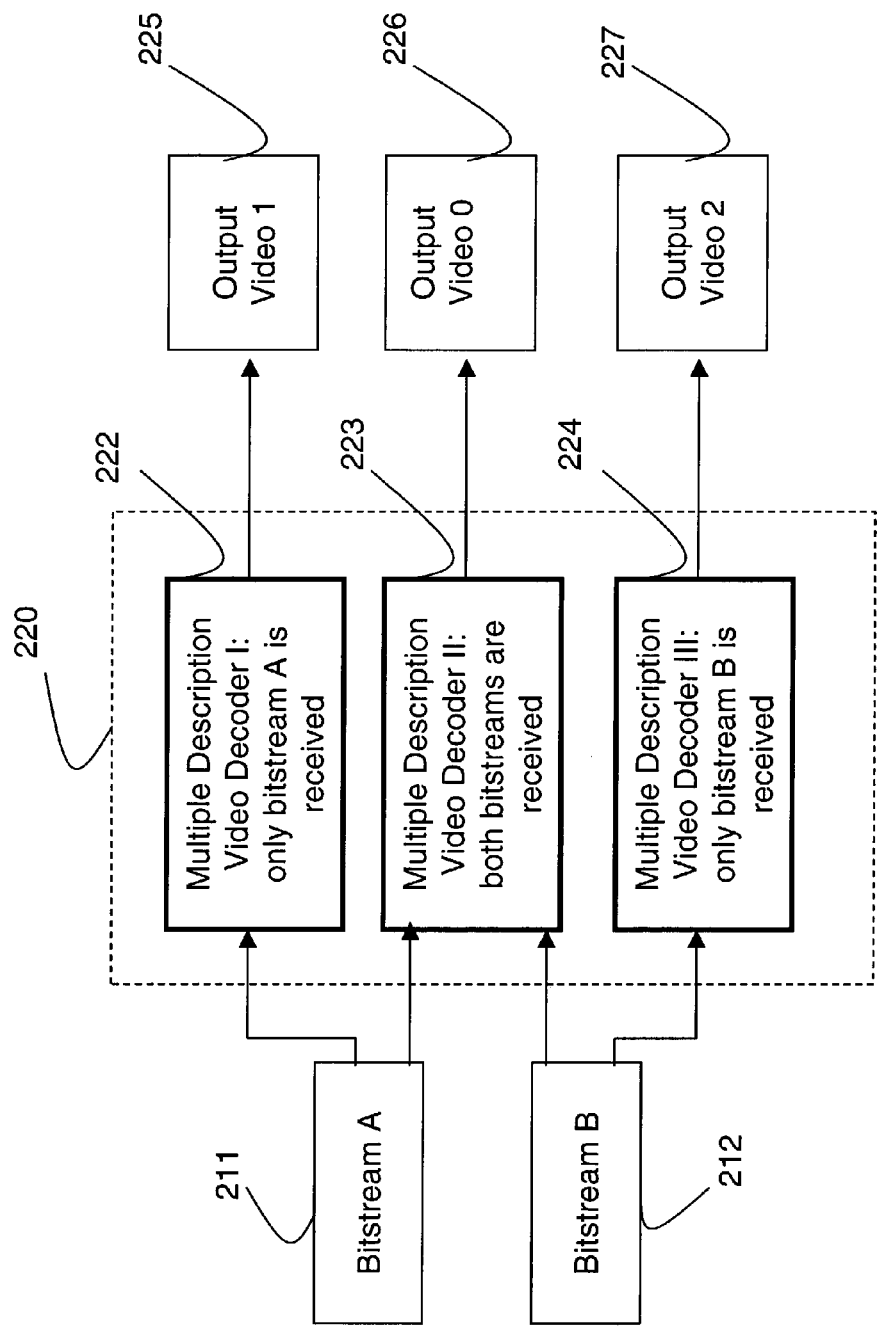
FIG. 2B is a block diagram of a prior art multiple description decoder.
Figure 2C:
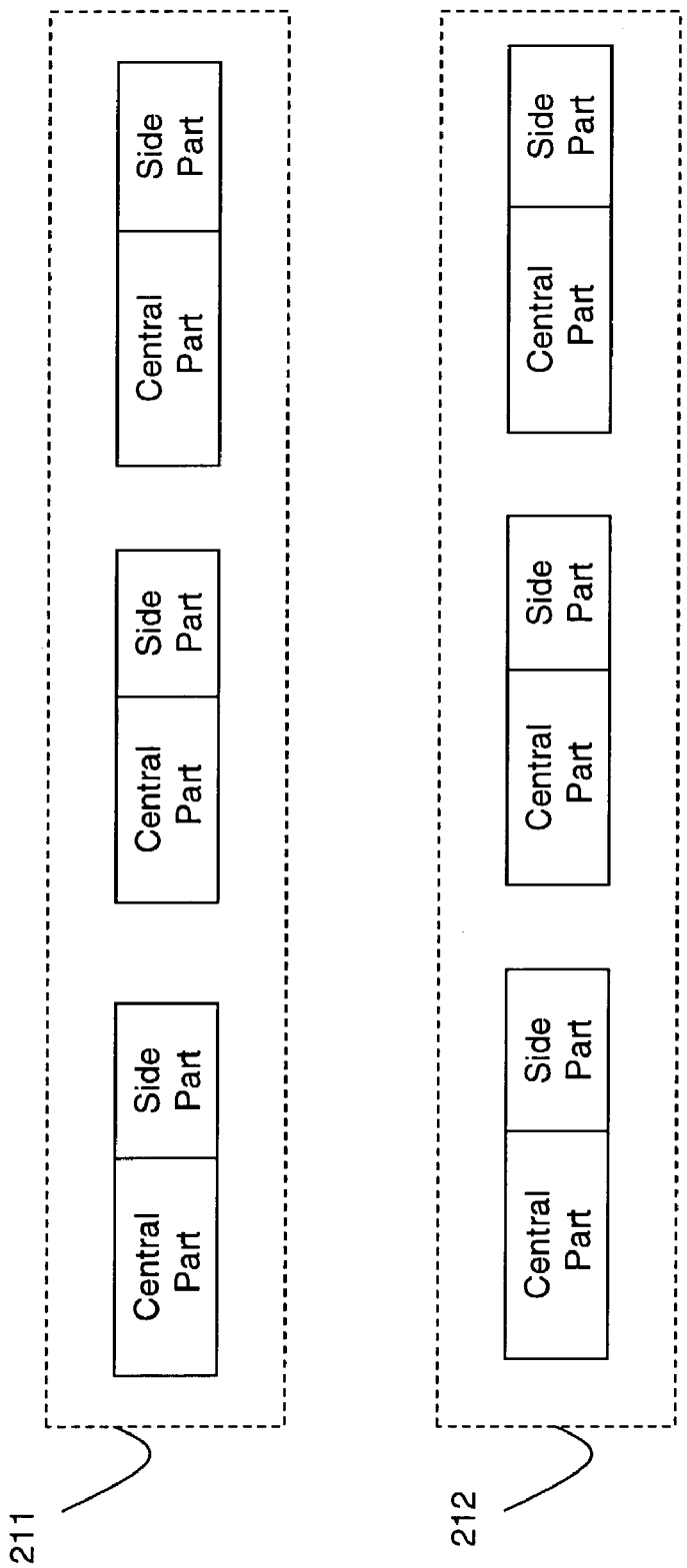
FIG. 2C is a block diagram of two bitstreams generated by the prior art multiple description encoder.
Figure 3A:
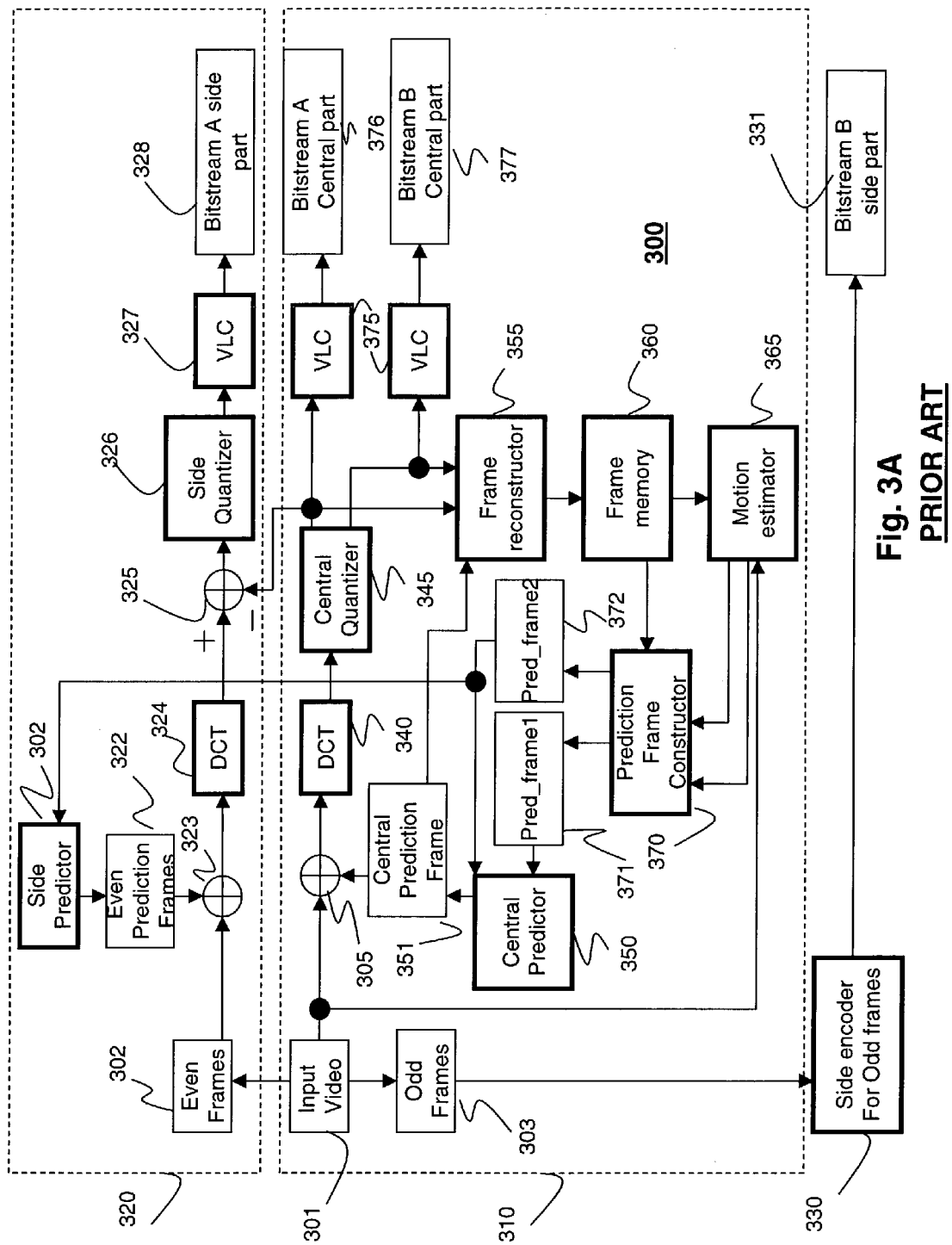
FIG. 3A is a block diagram of a prior art multiple description motion compensation encoder.
Figure 3B:
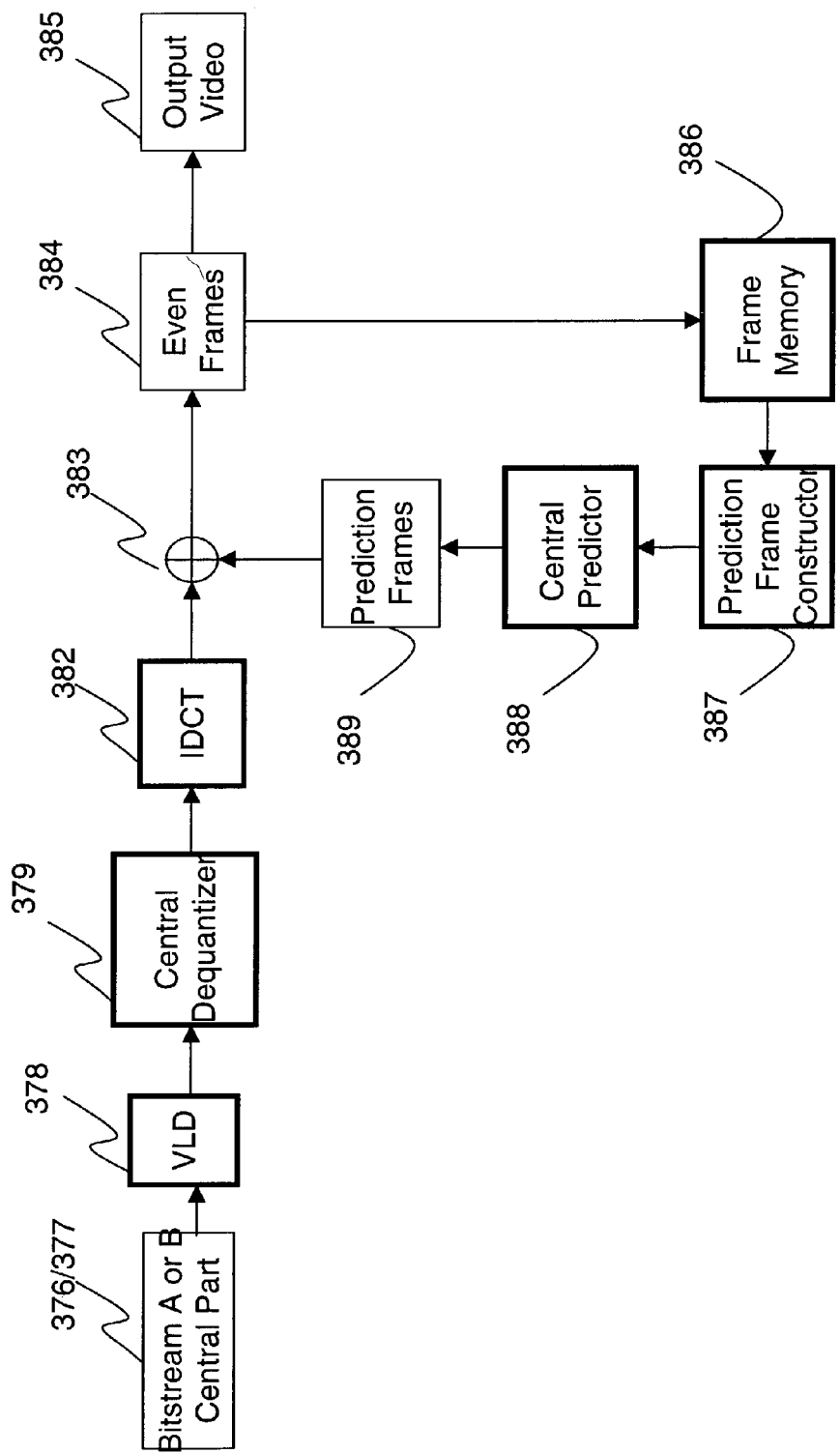
FIG. 3B is a block diagram of a prior art multiple description motion compensation central decoder.
Figure 3C:
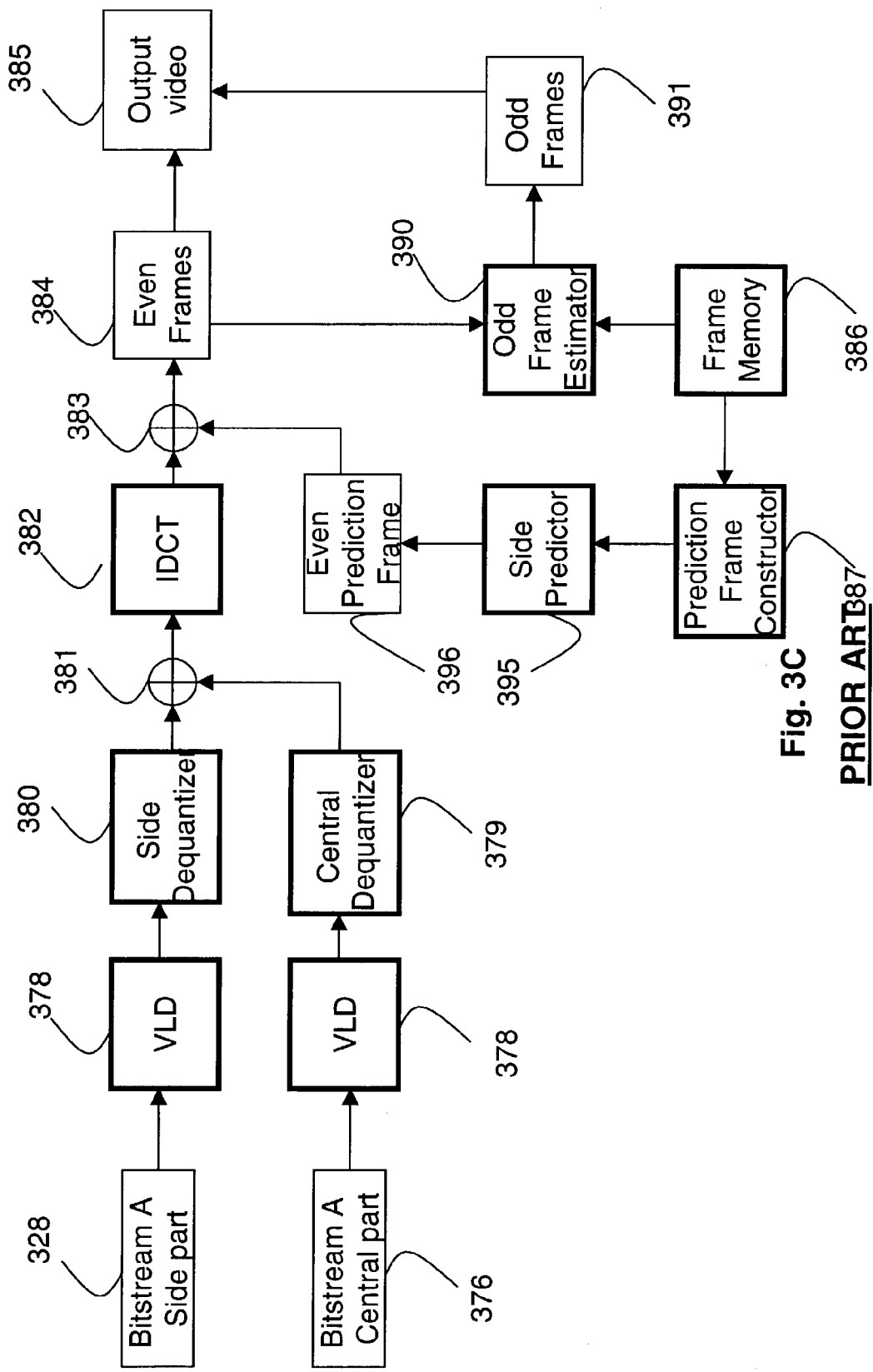
FIG. 3C is a block diagram of a prior art multiple description motion compensation side decoder.
Figure 4A:
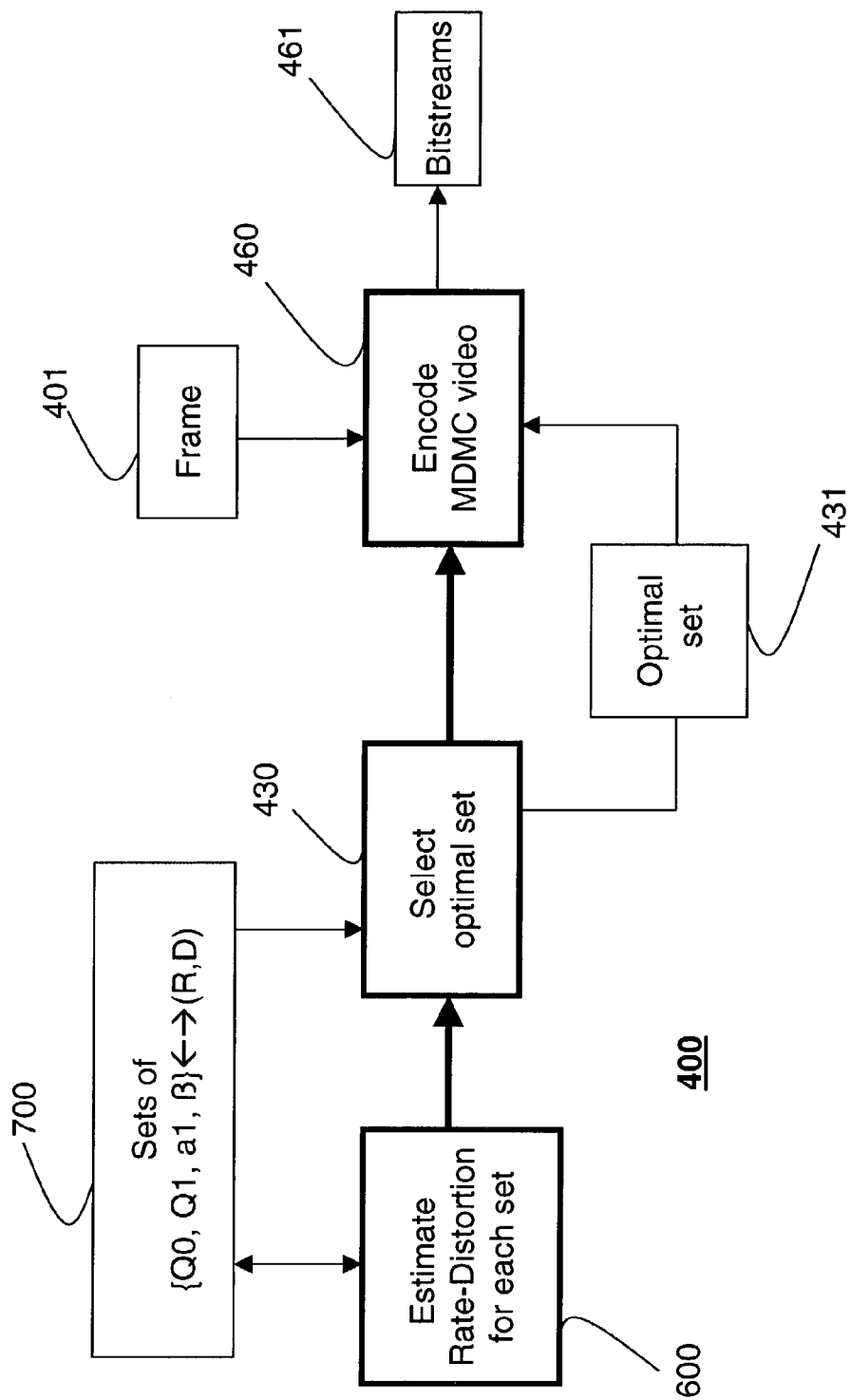
FIG. 4A is a flow diagram of adaptive multiple description motion compensation encoding according to the invention.

FIG. 4A shows a method 400 for adaptive multiple description motion compensation encoding according to the invention. A bit rate and an end-to-end distortion (an R-D pair) is estimated 600 for sets of coding parameters 700. The bit rate is based on characteristics of a transmission channel, and the end-to-end distortion is estimated based on signal statistics of a video. A particular set 431 of coding parameters that satisfies an available bit rate of the channel and that minimizes the end-to-end distortion of the video is selected 430. Motion compensated multiple descriptions 461 of frames of the video are encoded 460 according to the selected set of coding parameters. An optimal set 431 is selected for each frame to be encoded.

Figure 4B:
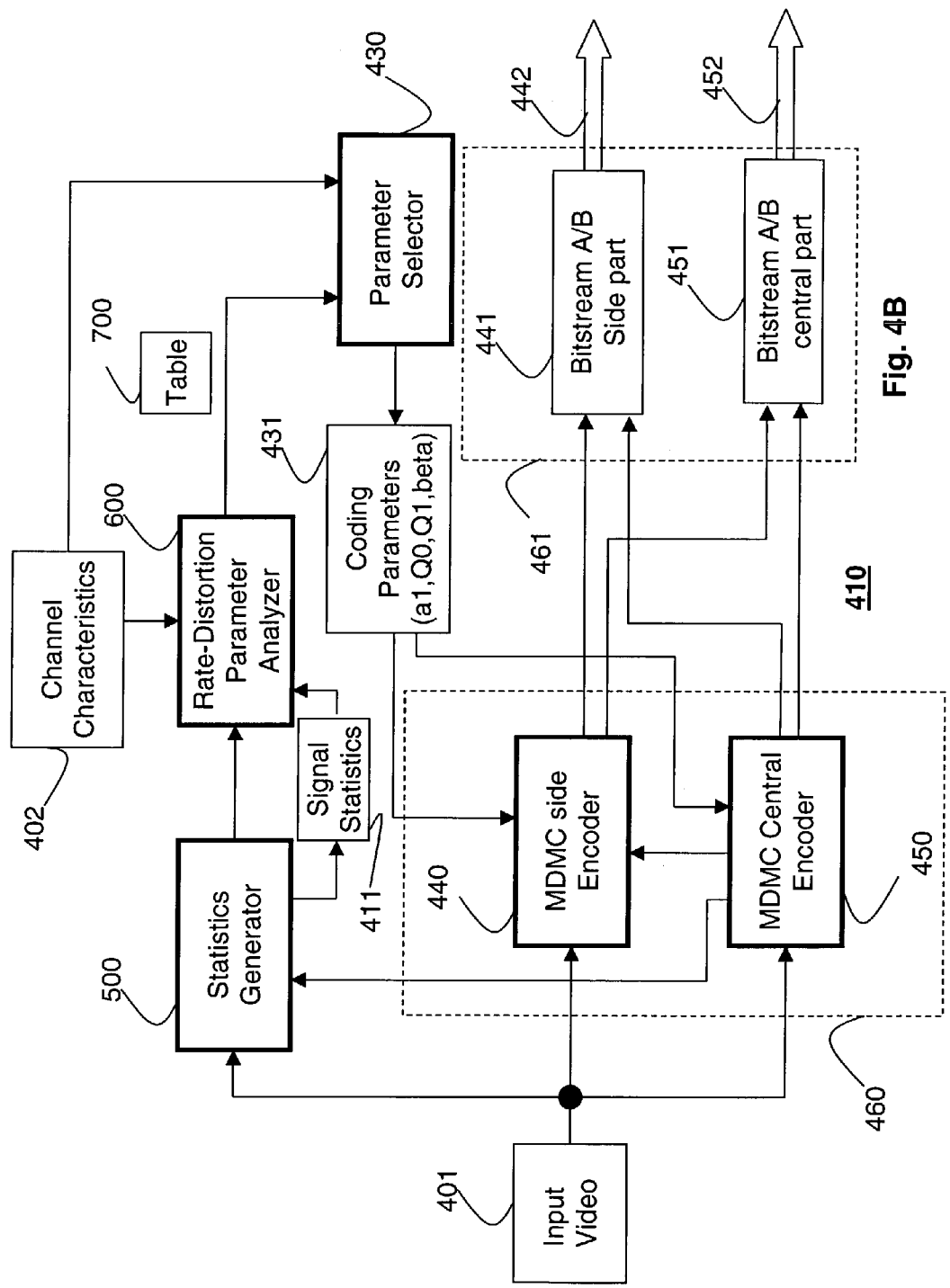
FIG. 4B is a block diagram of a encoder of a multiple description motion compensated encoder according to the invention.

As shown in FIG. 4B, an MDMC encoder 410 according to our invention includes a statistic generator 500, a rate-distortion-parameter analyzer 600, an optimal coding parameter selector 430, an MDMC side encoder 440 and an MDMC central encoder 450 connected to each other.

System Operation

The statistics generator 500 extracts signal statistics 411 from the input video 401 and as obtained by the MDMC central encoder 450. Specifically, the signal statistics include probability distributions 561, see FIG. 5, of the prediction error signals, which are measured using two sample sets of coding parameters. Details of this are explained below.

Using channel characteristics 402, as well as the statistics 411 produced by the statistics generator 500, the rate-distortion-parameter (R-D-P) analyzer 600 estimates the bit rate and the end-to-end distortion for the coding parameter sets 700. Each set includes distortion parameters Q0 and Q1, weighting parameter al, intra-block refresh rate β, and the current channel characteristics. The channel characteristics 402 include such measures as error rates 603 and bit rates (bandwidths), however the R-D-P analyzer 600 only makes use of the error rates 603. Assuming two channels, we denote the error rate for each channel as p1 and p2, and the available bit rates (bandwidth) as Bw1 and Bw2.

The optimal coding parameter selector 430 selects the set of optimal coding parameters 431 to be used for coding a current frame. This choice is based on the R-D-P relationship and the available bit rates, i.e., the aim is to encode 460 the current video frame so that the end-to-end distortion of the video is minimized, while at the same, time channel bit rate constraints are satisfied.

Using the selected optimal coding parameters 431, the MDMC side encoder 40 and the MDMC central encoders 450 generate bitstreams A 441 and bitstream B 451. The central encoder 450 uses two previous frames to construct the prediction frame and generate the central part of the two bitstreams. The side encoder 440 uses only the previous even (or odd) frame as a reference frame to generate the side part. Finally, the two bitstreams A/B 441 and 451 are transmitted over a first channel 442 and a second channel 452, respectively.

Statistics Generator

Figure 5:
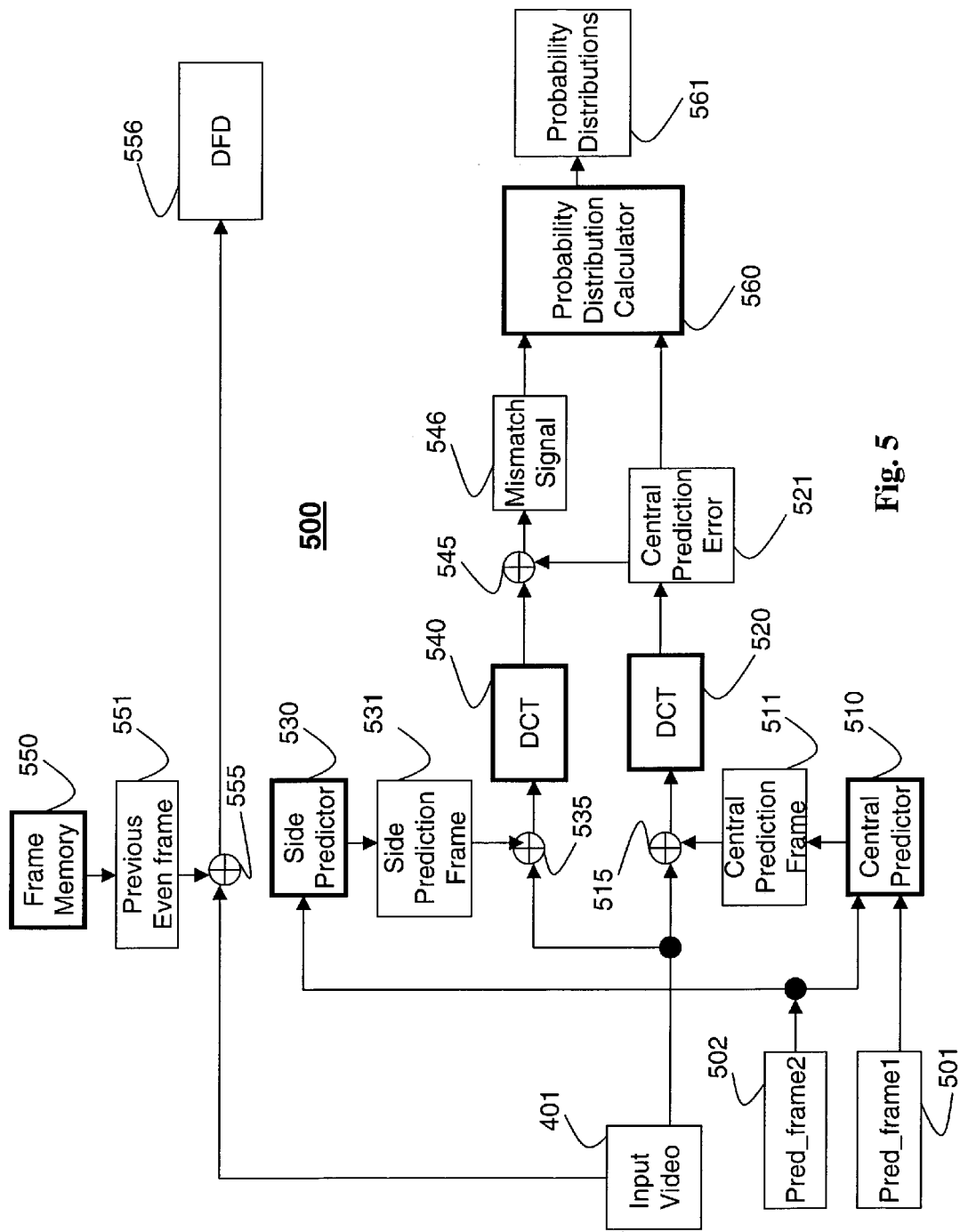
FIG. 5 is a block diagram of a statistics generator.

FIG. 5 shows the details of the statistic generator 500 that produces two probability distributions Pd1 and Pd2 561, and frame difference 556, DFD.

The statistics generator 500 extracts information from the input video 401 and MDMC central encoder 440 for input to the R-D-P analyzer 600, the output of which is used to select the optimal coding parameters 431. Two statistics are described, the probability distributions 561 from the central prediction error signal and mismatch signal, and the frame differences 556, i.e., a first difference between the current frame and a previous coded even frame and a second difference between the current frame and previous coded odd frame.

To generate the probability distributions 561, predicted frames 501 and 501 output from the MDMC central encoder 450, pred_frame1 and pred_frame2, are used along with the input video 401 to generate central prediction errors 521 and a mismatch signals 546 produced by a predetermined subset of all possible coding parameter combinations.

Specifically, pred_frame1 501 and pred_frame2 502 are passed to a central predictor 510, where equation (1) is used to generate a central prediction frame 511. A difference 515 between the current frame of the video 401 and the central prediction frame 511 is determined and subject to a DCT operation 520, producing a central prediction error 521 that is passed to a probability distribution calculator 560.

To calculate the probability that a DCT coefficient equals a given value in the set of all possible values, the probability distribution calculator 560 counts all DCT coefficients that equal a particular value. The count is then divided by the total number of all the DCT coefficients.

A side predictor 530 copies pred_frame2. A difference 535 of the current frame 401 and a side prediction frame 531 is calculated and subject to a DCT operation 540. The resulting signal is subtracted 545 from the central prediction error 521 to generate the mismatch signal 546. Similar to the central prediction error calculation, the probability distribution calculator 560 calculates the probability distribution of the mismatch signal 546.

The frame differences DFD 556 are also determined. A previous frame 551 stored in a frame memory 550 is subtracted from the current frame of the input video 401 to yield the DFD 556.

Rate-Distortion-Parameter Analyzer

The R-D-P analyzer 600 uses the probability distributions 561 and the frame differences 556 generated by the statistics generator 500 to dynamically maintain a R-D-P table 700. The table 700, for any frame to be encoded, defines the rate and end-to-end distortion for all possible coding parameter combinations.

Figure 6:
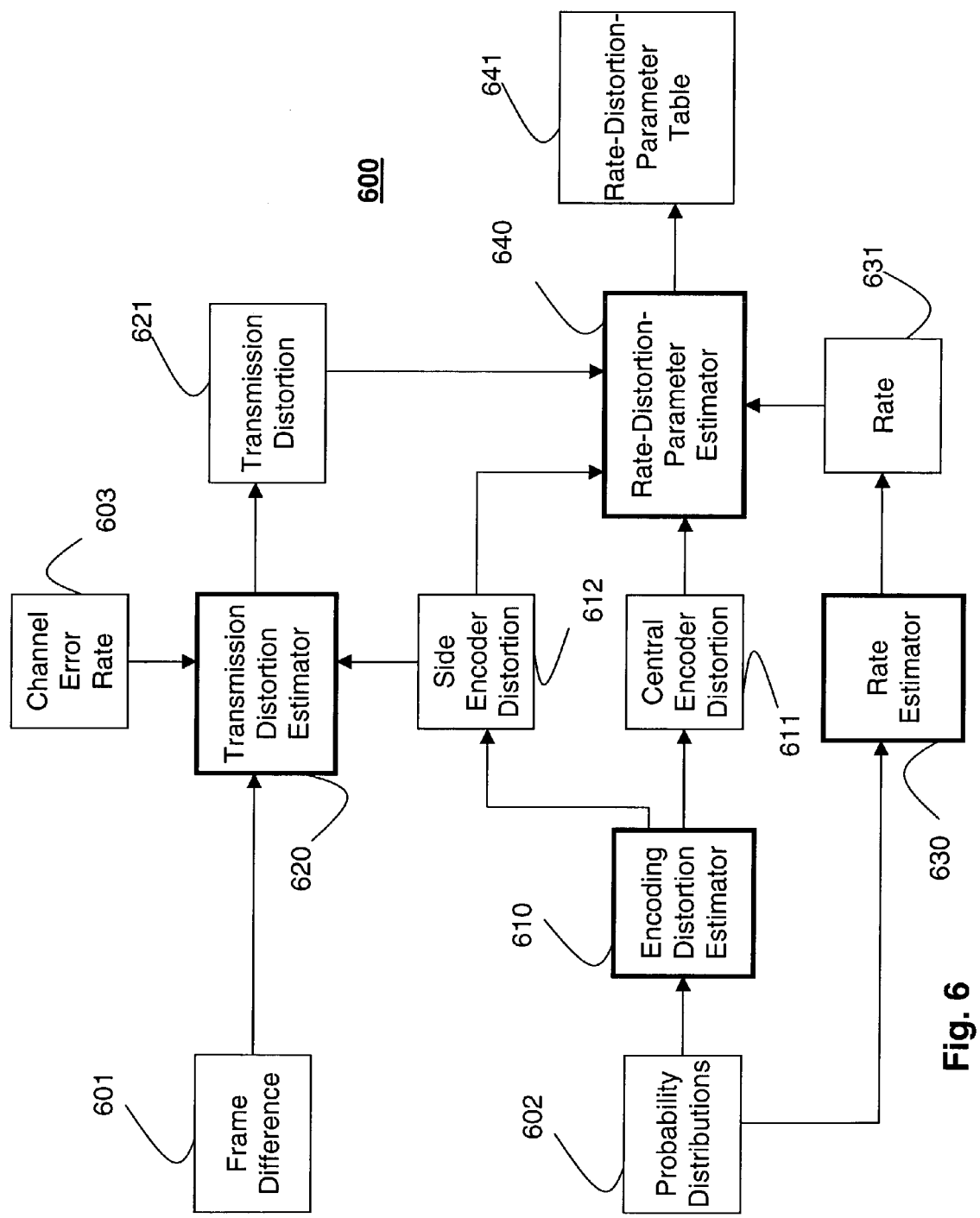
FIG. 6 is a block diagram of a rate-distortion-parameter analyzer.

FIG. 6 shows the R-D-P analyzer 600 according to our invention. There are three main components, an encoding distortion estimator 610, a transmission distortion estimator 620, and a rate estimator 630. Based on output of these three components, a R-D-P estimator 640 determines a bit rate 631, a central encoder distortion 611, a side encoder distortion 612, and a transmission distortion 621. The end-to-end distortion is determined by summing the transmission distortion 621 with the central and side encoding distortions 611–612. Finally, the R-D-P table 700 is maintained for all possible coding parameters.

An example R-D-P table 700 is shown in FIG. 7. The top-row 710 of the table indicates the combination of distortion parameters Q0 and Q1, while the left-column 720 of the table indicates the various weighting values a1. For any given combination of the distortion parameters Q0, Q1 and weighting parameters a1, a corresponding R-D pair is determined.

Encoding Distortion Estimator

Based on the probability distributions 561 of the prediction error signal and the mismatch signal, the encoding distortion estimator 610 determines the central and side coding distortions 611–612 for the central encoder and the side encoder for each set of coding parameters.

To estimate the side encoder distortion 612 for a predetermined weight al and quantization parameter QP0, the probability distribution of the mismatch signal is used to calculate the expected value of the absolute value of the mismatch signal, $m=E\{|\Theta|\}$. Then, the side encoder distortion is estimated by $$D_e(Q1 = Q) = 2m^2 - \\ (6Q^2 + (6m+1)Q - 2m - 1)e^{-2.5Q/m} - \frac{(2Q^2 + 4Q + 4mQ)e^{-4.5Q/m}}{1 - e^{-2Q/m}} \quad (2)$$

when Q is even, and $$D_e(Q1 = Q) = 2m^2 - (6Q^2 + (6m-1)Q)e^{-(2.5Q-0.5)/m} - \frac{(2Q^2 - 2Q + 4mQ)e^{-(4.5Q-0.5)/m}}{1 - e^{-2Q/m}} \quad (3)$$

when Q is odd.

The above equations are used to calculate the side encoder distortions for two predetermined weight values a1_1 and a1_2 for the weight parameter a1. Then, the value of $D_{e1}$ for other weight parameters a1 is estimated by, $$D_{e1}(a1 = a) = \quad (4)$$
$$D_e(a1 = a1\_1) + \frac{a - a1\_1}{a1\_2 - a1\_1}(D_e(a1 = a1\_2) - D_e(a1 = a1\_1)).$$

Similarly, to calculate the side encoder distortion for Q0, eqns. (2) or (3) are used to calculate sample distortion values for two predetermined quantization parameters Q0_1 and Q0_2. Then, the value of $D_{e1}$ for other quantization parameters Q0 can be estimated by $$D_{e1}(Q0 = Q) = \quad (5)$$
$$D_e(Q0 = Q0\_1) + \frac{Q - Q0\_1}{Q0\_2 - Q0\_1}(D_e(Q0 = Q0\_2) - D_e(Q0 = Q0\_1)).$$

Using equations (2), (3), (4) and (5), the side encoder distortion 612 for all the sets can be estimated.

Experiments shown that the parameters a1 and Q1 exhibits little or no influence on $D_{e0}$. Therefore, using equations (2) and (3) is sufficient to determined the central distortion 611 of all possible sets {Q0, Q1, a1}.

Because inter-blocks and intra-blocks have different values of m, there are two values $D_{e0}$ for a particular set {a1,Q0,Q1}: $D_{e0I}$ and $D_{e0p}$ for intra- and inter-blocks, respectively. The total central distortion 611 for a particular intra-block refresh rate β can be estimated as:

$$i.\ D_{e0} = \beta D_{e0I} + (1-\beta)D_{e0p}. \quad (6)$$

Using equations (2), (3) and (6), the central encoder distortion for the sets of parameters can be estimated.

Rate Estimator

The rate estimator 630 uses the probability distributions 561 of the prediction error signal and the mismatch signal to estimate the coding rate under current parameters. Encoding rates associated with predetermined subsets of coding parameters are calculated. Then, rates associated with all other parameter combinations are estimated based on the encoding rates of the predetermined subsets.

To estimate the bit-rate of side encoder for a predetermined weight a1 and distortion QP0, the percentage of zeros in the DCT coefficients of corresponding mismatch signals, ρ, is calculated using the probability distribution of mismatch signal. Then, the side encoder bit-rate is estimated by:

$$R1(Q1=Q)=c1(1-\rho). \quad (7)$$

This equation is used to calculate the side encoder bit-rate for two predetermined values of the weight parameter a1, a1_1 and a1_2. Then, the value of R1 for other possible values of the weight parameter a1 can be estimated using the following equation:

$$R1(a1=a)=\log(b+d*a1^2), \quad (8)$$

where b and d are two constants for the current frame of input video 401.

Equation (7) is used to calculate the side encoder bit-rate for two predetermined values of the distortion parameter Q0, Q0_1 and Q0_2. Then, the value of R1 for other possible values of the distortion parameter Q0 can be estimated using the following equation:

$$R1(Q0=Q)=e+f*Q, \quad (9).$$

where e and f are two constants for the current frame.

Using equations (7), (8) and (9), the side encoder bit rate of the sets of coding parameters is determined.

Equation (7) is used to calculate the central encoder bit-rate for two predetermined values of the weight parameter a1, a1_1 and a1_2. Then, the value of R0 for other possible values of a1 can be estimated using the following equation:

$$R0(a1=a)=\log(g+h*a), \quad (10).$$

where g and h are two constants for the current frame.

The distortion parameter Q1 has no influence on the value R0. Therefore, using equation (7) and (10) is sufficient to determined the central distortion of all possible sets {a1, Q0, Q1}.

Because inter-blocks and intra-blocks have different values of ρ, there are two $R_0$ values for a particular set of {a1, Q0, Q1}: $R0_I$ and $R0_p$ for intra- and inter-blocks, respectively. The central bit-rate for a particular value of the intra-block refresh rate β can be estimated by:

$$R0=\beta R0_I+(1-\beta)R0_p. \quad (11).$$

Using equations (7), (10) and (11), the central encoder bit-rate of the sets of coding parameters can be estimated.

Transmission Distortion Estimator

The transmission distortion estimator 620 is based on the channel error rate 402, the side encoder distortion 612 and the frame difference 556. The estimator estimates the average transmission distortion 621 under candidate coding parameters and current channel characteristics.

To calculate the transmission distortion 621, several cases associated with possible decoding scenarios are considered.

In the first scenario, the current frame is not received. The transmission distortion associated with this case, $D_n^2$, is modeled as, $$D_n^2=(1-p_{n+1})E\{(\text{pred\_frame1}-\text{pred\_frame2})^2\}+p_{n+1}DFD+(1-\beta)D_{n-1})$$

where $D_{n-1}$ is the total transmission distortion of the last frame (n−1), DFD is the frame difference as described above, and $p_n$ is the channel loss rate at frame n.

In the second scenario, the current frame is received but the previous frame is lost. The transmission distortion associated with this case, $D_n^1$, is modeled as, $$D_n^1=(1-\beta)(E\{(\text{pred\_frame1}-\text{pred\_frame2})^2\}+D_{n-2}),$$

where $D_{n-2}$ is the total transmission distortion from two frames prior to the current frame (n−2).

In the third scenario, both the current frame and the previous frame are received. The transmission distortion associated with this case, $D_n^0$, is modeled as, $$D_n^0 = (1-\beta)\left(a1^2 D_{n-1}^{01} + (1-a1)^2 D_{n-2} + 2*r*a1*(1-a1)\sqrt{D_{n-1}^{01} D_{n-2}}\right),$$

where r is a constant and $D_{n-1}^{01}$, is given by $$D_{n-1}^{01} = (1 - p_{n-2})D_{n-1}^0 + p_{n-2}D_{n-1}^1.$$

Based on the above three scenarios, the total transmission distortion 621 at frame n is modeled as, $$D_n = (1-p_n)((1-p_{n-1})D_n^0 + p_{n-1}D_n^1) + p_{n-1}D_n^2$$

A unique aspect of the above models is that a direct relationship among the rate, distortion and coding parameters of an MD coder is established. In this way, the encoder can select the optimal coding parameters directly to minimize end-to-end distortion and satisfy bit rate constraints.

Selection of Optimal Coding Parameter

Under current channel characteristics, the optimal coding parameters are those that minimize the end-to-end distortion (D) while satisfying bit rate constraints (R). In the adaptive MDMC coder according to our invention, the R-D-P analyzer 600 dynamically maintains the R-D-P table 700 to be used by the optimal coding parameter selector 430. Based on the available bit rate for the current frame, the optimal coding parameter selector searches the R-D-P table 700 and selects the entry with the smallest distortion, while satisfying the available bit rate constraint. The parameters in that entry are selected as the optimal coding parameters 431, which are then passed to the MDMC encoder 460 to encode multiple descriptions 461 of the current video frame.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for encoding a video including a sequence of frames to be transmitted over a channel, comprising:
    estimating, for each of a plurality of sets of coding parameters, a bit rate based on characteristics of the channel and an end-to-end distortion of the video based on signal statistics of the video;
    measuring probability distributions of prediction error signals using a plurality of predetermined subsets of the plurality of sets of coding parameters;
    selecting, for each frame of the video, a particular set of coding parameters that satisfies an available bit rate of the channel and that minimizes the end-to-end distortion of the video; and
    encoding motion compensated multiple descriptions of the frame according to the selected set of coding parameters.

2. The method of claim 1, wherein the characteristics of the channel include a channel error rate and a bit rate.

3. The method of claim 1, further comprising:
    outputting a first bitstream including bits of coded even frames of the video; and
    outputting a second bitstream including bits of coded odd frames of the video.

4. The method of claim 3, wherein each bitstream corresponding to a coded frame includes a side part of the coded frame and a central part of the coded frame.

5. The method of claim 1 wherein each set of coding parameters includes quantization parameters Q0 and Q1, weighting parameter a1, and a refresh rate β.

6. The method of claim 4 wherein the side part is a sequence of side prediction frames and the central part is a sequence of central prediction frames, further comprising:
    constructing each side prediction frame using a previous frame; and
    constructing each central prediction frame using two previous frames.

7. The method of claim 3 further comprising:
    transmitting the first bitstream over a first channel; and
    transmitting the second bitstream over a second channel.

8. The method of claim 1 wherein the signal statistics include probability distributions of a prediction error signal and a mismatch signal.

9. The method of claim 8 wherein the signal statistics also include a first difference between a current frame and previous even frame, and a second difference between the current frame and a previous odd frame.

10. The method of claim 6 further comprising:
    determining a difference between a current frame and the central prediction frame; and
    generating the central prediction error from a discrete cosine transform operation on the difference between the current frame and the central prediction frame.

11. The method of claim 10 further comprising:
    determining a difference between the current frame and the side prediction frame;
    generating the side prediction error from a discrete cosine transform operation on the difference between the current frame and the side prediction frame;
    generating a mismatch signal by subtracting the side prediction error from the central prediction error.

12. The method of claim 1 wherein the estimating further comprises:
    summing a transmission distortion with an encoding distortion.

13. The method of claim 1, wherein the estimating further comprises:
    generating encoding distortions for predetermined subsets of the plurality of sets of coding parameters combinations.

14. The method of claim 13, wherein the coding distortions for each predetermined subset of the plurality of sets of coding parameters is $$D_e(Q1 = Q) = 2m^2 - (6Q^2 + (6m+1)Q - 2m - 1)e^{-2.5Q/m} - \frac{(2Q^2 + 4Q + 4mQ)e^{-4.5Q/m}}{1 - e^{-2Q/m}}$$

when Q is even; and $$D_e(Q1 = Q) = 2m^2 - (6Q^2 + (6m-1)Q)e^{-(2.5Q-0.5)/m} - \frac{(2Q^2 - 2Q + 4mQ)e^{-(4.5Q-0.5)/m}}{1 - e^{-2Q/m}}$$

when Q is odd, where Q is a coding parameter in the predetermined subset and $m = E\{|\Theta|\}$ is an absolute value of the mismatch signal.

15. The method of claim 14, wherein the distortion values $D_{e1}$ for the plurality of sets of all coding parameters is determined by $$D_{el}(a1 = a) =$$
$$D_e(a1 = a1\_1) + \frac{a - a1\_1}{a1\_2 - a1\_1}(D_e(a1 = a1\_2) - D_e(a1 = a1\_1)),$$

where a1 is a weighting parameter and a1_1 and a1_2 are parameters from the subset of predetermined coding parameters; and $$D_{el}(Q0 = Q) =$$
$$D_e(Q0 = Q0\_1) + \frac{Q - Q0\_1}{Q0\_2 - Q0\_1}(D_e(Q0 = Q0\_2) - D_e(Q0 = Q0\_1)),$$

where Q0_1 and Q0_2 are probability distributions from the subset of predetermined coding parameters.

16. The method of claim 8, further comprising:
    estimating a bit rate according to the prediction error signal and the mismatch signal.
17. The method of claim 16, further comprising:
    generating error rate values for each of the predetermined subset of possible coding parameter combinations; and
    estimating error rate values for all possible combinations of coding parameters based on the rate values of the predetermined subsets.
18. The method of claim 17, further comprising:
    estimating transmission distortion of a frame n according to each error rate value for the plurality of sets of coding parameters, distortion values for the plurality of sets of coding parameters and current channel characteristics; and
    selecting coding parameters that minimize the end-to-end distortion according to the error-rates and channel characteristics.
19. The method of claim 5, wherein the bit rate for each predetermined subset of the plurality of sets of coding parameters is $$R1(Q1=Q)=c(1-\rho1) \text{ and } R0(Q0=Q)=c0(1-\rho0),$$

where $\rho1$ is the percentage of zeros in DCT coefficients of a corresponding mismatch signal, and $\rho0$ is the percentage of zeros in DCT coefficients of the central prediction errors.

20. The method of claim 6, wherein the bit rate for the plurality of sets of coding parameters is determined by $$R1(a1=a)=\log(b+d*a12) \text{ and } R0(a1=a)=\log(g+h*a),$$

where b, d, g and h are constants estimated by two predetermined subsets.

21. A system for encoding a video including a sequence of frames to be transmitted over a channel, comprising:
    a rate-distortion parameter analyzer configure to estimate, for each of a plurality of sets of coding parameters, a bit rate based on characteristics of the channel and an end-to-end distortion based on signal statistics of the video;
    means for measuring probability distributions of prediction error signals using a plurality of predetermined subsets of the plurality of sets of coding parameters;
    means for selecting, for each frame, a particular set of coding parameters that satisfies an available bit rate of the channel and that minimizes the end-to-end distortion of the video; and
    an encoder configured to generate motion compensated multiple descriptions for the frame according to the selected set of coding parameters.

* * * * *